Oct. 26, 1954    R. D. HEFFELFINGER    2,692,472
STRAND MACHINE STOPPING DEVICE AND METHOD
Filed Aug. 12, 1949
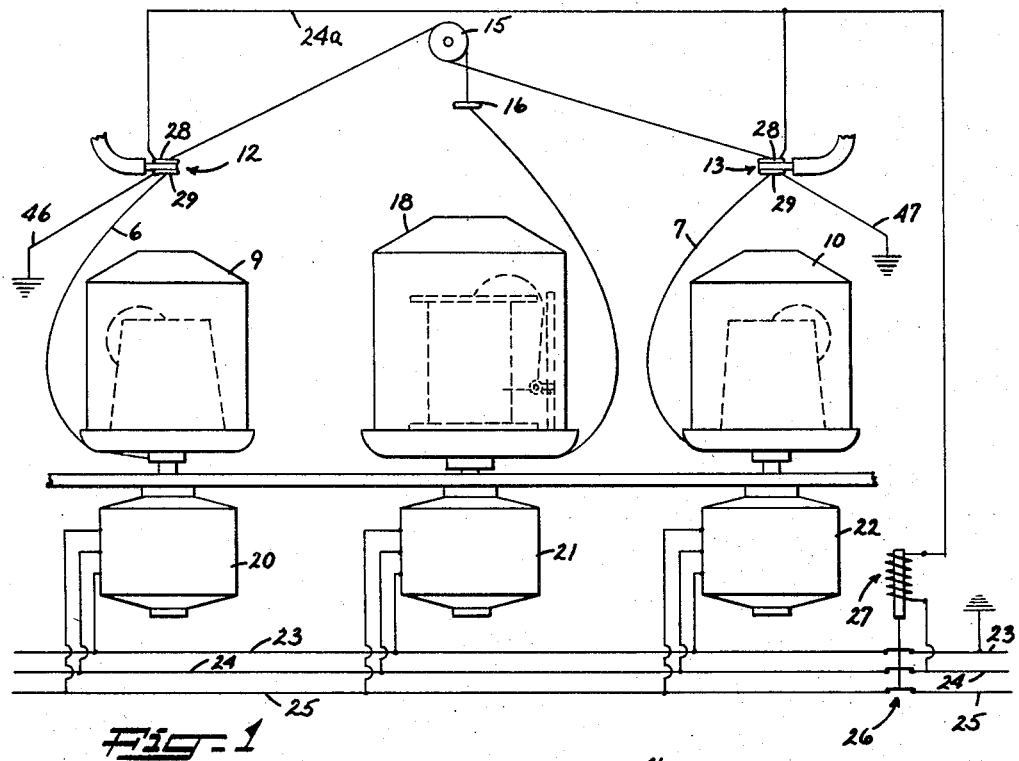
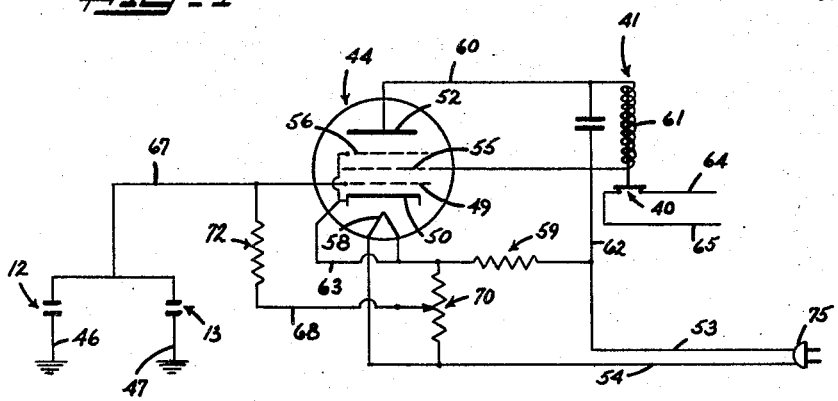
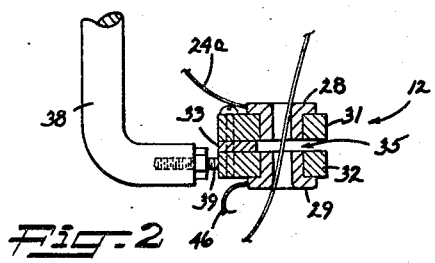
INVENTOR.
ROBERT D. HEFFELFINGER
BY
Thomas R O'Nally
ATTORNEY.

Patented Oct. 26, 1954

2,692,472

UNITED STATES PATENT OFFICE 2,692,472

STRAND MACHINE STOPPING DEVICE
AND METHOD

Robert D. Heffelfinger, Lansdowne, Pa., assignor to American Viscose Corporation, Wilmington, Del., a corporation of Delaware Application August 12, 1949, Serial No. 109,845

12 Claims. (Cl. 57—81)

This invention relates to a method and apparatus for automatically stopping a machine for handling a non-conductive strand and particularly to an apparatus for effecting predetermined stopping of twisting or winding machines in response to the passage of conductive sections of a strand therethrough.

It is an object of the invention to provide a method and apparatus for stopping a machine such as a strand twister when a specific section of a running strand, corresponding in timed relationship with a desired cessation of operation, passes through the machine. It is specifically an object to effect stopping of the machine before the strand supply is completely exhausted so as to avoid the need for relacing the machine. It is still another object to provide a simple and inexpensive method and apparatus which may be readily applied to conventional machinery. Other objects, features and advantages will be apparent from the following description of the invention and the drawing relating thereto in which Fig. 1 is a diagrammatic representation of a cord twister to which the invention is applied;

Fig. 2 is a view partly in section of a specific type of thread guide; and

Fig. 3 illustrates an electrical circuit for detecting a stopping signal.

Briefly, the invention uses conductors electrically insulated from each other and mounted on or adjacent a machine for handling a running strand so that the strand as it passes to or through the machine remains in continuous contact with the conductors. The conductors are closely spaced terminals of an otherwise closed electrical circuit for operating a stopping mechanism for the machine so that operation of the stopping mechanism occurs when the conductors are bridged by a conductive section of the strand. Preferably the conductors are constructed as spaced thread-guiding sections of a guide for the strand.

In Fig. 1, a cord twister is illustrated in which strands 6 and 7 are withdrawn from respective packages supported within singles twisters 9 and 10 of the multiple-twist type. Each strand passes through a separate guide, either 12 or 13, mounted above a singles twister. Strands 6 and 7 then pass around a pulley 15 through a guide 16 into a balloon of the strand which revolves about the cord twisting and winding unit 18.

Guides 12 and 13 are similar in construction and Fig. 2 shows the details thereof. The guide comprises two metal eyelets 28 and 29 each supported within an aperture of one of the non-conducting members 31 and 32. In the case that one of the eyelets is grounded, the apertured supporting member therefor may be conductive, if desired. An insulating spacer element 33 separates the members 31 and 32 and provides a gap with a clearance 35 between the eyelets 28 and 29 to prevent arcing or the passage of an electric current except when a conductive portion of the strand closes the circuit therebetween. A clearance of $\frac{1}{16}$ of an inch is ample to meet the conditions contemplated. The thread guide is supported on a member 38 and secured thereto by a threaded element 39 extending in threaded relationship into the member 32 and the bracket 38.

The separate units of the cord twister are driven by the motors 20, 21 and 22, or the spindles of the units may be provided with pulleys (not shown) and the units driven from a single motor and a belt. As shown, three-phase motors 20, 21 and 22 receive their power from the supply lines 23, 24 and 25. In a simple application of the invention an electro-magnetically controlled switch 26 may be used to control the electrical current flowing to the motors. The switch is normally closed but is opened when the coil 27 is energized. To obtain a circuit for the coil, one end of the coil is connected by conductor 24a to line 24 and the other end is connected to an eyelet 28 of each of the guides 12 and 13. The line 23 and the other eyelet 29 of the guides are grounded. An electric current is thus developed in the coil 27 when the eyelets 28 and 29 of one of the guides are bridged. If desired, the grounded eyelet may be connected directly to the line 23.

While such a circuit arrangement is one of the simplest possible, an electrical system may be preferred wherein the current passing the conductors or eyelets of either guide 12 or 13 is small and is amplified by means such as an electronic circuit to provide sufficient current to operate switch 26 or equivalent stopping mechanisms. Such an electrical system is shown in Fig. 3 and is hereinafter described.

When a conductive section of the yarn 6 or 7 passes through its respective guide 12 or 13, an electrical connection is established between the ground through lines 46 or 47 connected therewith and the grid 49 of the tube 44. The grid, when this occurs, becomes less negatively charged and effects an increase in the flow of electrons from the heated cathode 50 of the tube to the plate 52 thereof. An electrical potential is developed by the cathode and the plate as a result of their being connected directly to lines 53 and 54 of an alternating current source which may be conveniently the usual commercial 120 volt 60 cycle supply. A screen grid 55 is connected in parallel with the plate 52 to one of the alternating current supply lines 53 through line 62 to facilitate the passage of electrons from the cathode to the plate. Still another grid 56 is connected in parallel with the cathode to provide a charged suppressor in the vicinity of plate 52 to prevent the loss by radiation or secondary emission of electrons which reach the plate. The heating filament 58 is connected with the power lines 53 and 54 in series with a resistance 59 which regulates the voltage applied to the filament.

A flow of electrons through the tube 44 is controlled by the nature of the charge on the control grid 49 connected with the guides 12 and 13. During the passage of untreated or non-conductive strand through the guides, the grid 49 is negatively charged to some potential below that of the plate. However, as soon as a conductive section of the strand passes through one of the guides 12 or 13, the grid 49 becomes less negatively charged as a result of the flow of electrons from the ground thereto. The negatively charged grid permits more current to flow between the cathode and the plate and a rectified current is produced in the circuit comprising the plate 52, the line 60, electromagnetic coil 61 of the relay switch 41, line 62, a resistance 59, the line 63, and the cathode 50. The current developed in this circuit energizes the coil 61 sufficiently to open the switch 40, the terminals of which are connected by lines 64 and 65 with the holding coil of a motor controller (not shown). The charge on the grid 49, connected with the guides by line 67, may be varied to produce a current of the desired strength through the coil 61 by connecting the grid 49 by a line 68 with a variable resistance 70 connected between lines 54 and 63. A large auxiliary resistance 72 is placed in the line 68.

Since one side of the power circuit is normally grounded, the circuit hereinabove described will always be connected with the power circuit so that the elements of the tube are energized in the proper relationship to obtain operation of the tube when the grid 49 is connected with the grounds 47 and 46. For this purpose, a plug 75 and a complementary socket (not shown) are provided which connect the circuits illustrated in Fig. 3 in specific pole or terminal relationship with an electrical power supply.

The electrical circuit such as just described for amplifying the electrical current of low intensity which passes between the eyelets of either guide 12 or 13 through a conductive portion of the strand is typical of one of the many circuits which may be devised to amplify the current to sufficient strength to operate a relay or other switching mechanism such as needed to interrupt the power to the driving means. While Fig. 3 shows two guides placed in the circuit, the circuit is operative with any number of guides arranged in parallel relationship between the ground and the grid 49.

In order to establish a satisfactory flow of current between the ground 46 and 47 and the grid 49, it is preferable that the strand pass through the guides 12 or 13 in a taut condition and in positive contact with both eyelets of the guide. An electrical circuit such as that described may be adjusted to respond to an electrical current of almost any intensity passed along line 67 to the grid 49. However, the operation of the apparatus is more satisfactory when the circuit does not have to be tuned for extremely faint signals.

To obtain the conductivity necessary in a section of the strand to transmit an electrical current between the separated conducting portions of a strand guide, the strand may be rendered conductive by treatment with a hygroscopic material, a metallic suspension or a coating of metallized film or fine wire applied to the section, or the strand may be severed and a conductive insert secured to and between the severed ends. A principal use of the invention is to stop a twisting machine, especially cord twisting machine, just before the supply package is exhausted. The machine may thereby come to a stop from its high speed before the end of the strand passes through the machine, and the necessity for replacing the machine does not arise. A section of the strand two inches or more in length may be made conductive at any desired distance from the strand end of the package. If preferred, the entire length of the last several yards of a package, which under some winding procedures are discarded, may be treated to obtain conductivity of the strand. In the event that the material applied to the strand is objectionable to later processing of the strand and it is wished to avoid contaminating the remainder of the package, the first windings of the supply package formed by a prior winding operation may be wound onto a support core outside the main body of the package; such windings are analogous to the transfer tail conventionally provided on packages to be rewound.

For nearly all textile materials, a solution of calcium chloride is a satisfactory impregnant; The solution being of sufficient concentration when applied to the strand, so that it will raise and maintain the regain in moisture of a treated section at a concentration sufficiently high to insure operation of the stopping device. Other suitable deliquescent materials may include various inorganic chlorides, bromides, sulfates, hydroxides, carbonates and nitrates, and inorganic materials such as glycerol, triethanolamine, and sorbitols.

In nearly all climates, the atmosphere is sufficiently humid to supply the moisture necessary to render the hygroscopic material applied to the strand conductive, especially if suitable means is provided to amplify the current passed through the strand which bridges the circuit between the guide sections. However, in the event that raising of the moisture content of the atmosphere is required to render a strand which has been impregnated with a desired hygroscopic agent sufficiently conductive, air or other gaseous medium may be passed through a water spray or other moisturizing device and discharged into the region in which the strand is stored or through which it must pass before entering the guides hereinbefore described.

Liquid suspensions of metallic dusts or metals or metallic alloys such as aluminum, copper, brass, nickel etc., as well as powdered graphite may be used to render sections of strands conductive. Metallic dusts or other powdered conductive materials are preferably suspended in aqueous medium, or oils or other liquids of non-oxidizing and volatile character.

While preferred embodiments of the invention have been shown and described, it is to be understood that changes and variations may be made without departing from the spirit and

I claim:

1. A method of stopping a machine for handling a running strand of non-conductive material comprising treating a section of the strand spaced a predetermined distance from an end thereof to render it conductive, passing the strand between and in continuous contact with the terminals of an open circuit containing an electrical current source until the treated section bridges the terminals, and passing the current produced in the circuit upon closing of the circuit by said bridging action, through an electrical stopping means for the machine.

2. A method of stopping a machine for handling a running strand of non-conductive material including impregnating a section of the strand spaced from one end of the strand with a deliquescent material, providing an atmosphere which contains moisture, passing the strand between and in contact with the terminals of a circuit adjacent a gap in the circuit until the impregnated section bridges the gap, amplifying the transfer of electrical energy passing through the conductor as the gap is closed, and passing the amplified current through electrical stopping means for the machine.

3. A method of stopping a machine for handling a running strand of non-conductive material including impregnating a section of the strand spaced from one end of the strand with a metallic suspension to impart electrical conductivity to the section, guiding the strand along a desired path while passing it over and in contact with portions of an electrical circuit at opposite sides of a gap in the circuit, amplifying a current produced in the circuit as the impregnated section bridges the gap, and conducting the amplified current through an electrical stopping means for the machine.

4. A method of stopping a strand twisting machine comprising providing a continuous strand of non-conductive material having a conductive section spaced a predetermined distance from one end of the strand, pulling the strand through a balloon, supporting the running strand at the discharge end of the balloon on conductors supported at opposite sides of a gap in an electrical circuit, passing the strand over the conductors until the gap is bridged by the conductive section, and operating a stopping means for the machine from the flow of current through the completed circuit.

5. A method of stopping a strand twisting machine comprising pulling a strand of non-conductive material having a conductive section spaced a predetermined distance from the end of the strand through a balloon, supporting the running strand as it passes from the discharge end of the balloon on two spaced electrically conductive elements one which is grounded and the other connected with electronic amplifying means, amplifying the signal transmitted to the amplifying means when the conductive section bridges the elements to produce an electrical current, and actuating a stopping means for the machine with said current.

6. Apparatus for twisting and winding a strand comprising means for supplying the strand, a spindle and a package support associated therewith for winding the strand, guide means for the strand supported between the supply means and the package support having two spaced thread-guiding sections of electrically conductive material, and electrical means for stopping the apparatus included in an electrical circuit with the spaced guide sections, said electrical means being responsive to a current produced when the sections are bridged by a conductive section of the strand.

7. Strand doubling apparatus comprising a plurality of singles twisters, strand guides mounted adjacent each singles twisters, each of said guides comprising two spaced thread-guiding sections of electrically conductive material, means for gathering the strands into a single group, a doubling unit for twisting and collecting the group of strands, and electrical means for stopping the machine connected with the spaced guide sections and responsive to the current passed through the stopping means and the guide sections when the sections of any one guide are bridged by a section of electrically conductive strand.

8. A method of stopping a machine for handling a running strand which is electrically non-conductive except for a short length spaced a predetermined distance from one end of the strand comprising the steps of passing the strand progressively over, and in continuous contact with, two spaced terminals of an electrical circuit, said circuit when closed acting to stop the flow of energy for driving the machine, continuing the advancement of the strand until the terminals are bridged by said conductive section to close and thus energize said circuit, and stopping the flow of energy to the driving means by said energized circuit whereby the driving means may come to a stop.

9. A method of stopping a machine for handling a running strand which is electrically non-conductive except for a short length spaced a predetermined distance from one end of the strand comprising the steps of passing the strand progressively over, and in continuous contact with, two spaced terminals of an electrical circuit, said circuit when closed acting to stop the flow of energy for driving the machine, continuing the advancement of the strand until the terminals are bridged by said conductive section, and passing the current produced in the circuit upon the closing thereof by said bridging action through an electrical stopping means for the machine.

10. Apparatus for handling a continuous strand comprising means for supplying a strand, means for receiving a strand, means for continuously drawing the strand from the supply means to the receiving means, means for guiding the strand along a predetermined path from the supply means to the receiving means comprising a guide having closely-spaced juxtaposed thread-guiding sections of electrically conductive material spaced lengthwise of said path and a section of electrically non-conductive material for separating the conductive sections from each other, said conductive sections being positioned along said path to provide lateral support, and to be engaged by, the strand in passing along the path, means for stopping the drawing means, and an open electrical circuit for energizing the stopping means for the apparatus in which said conductive sections are terminals which may be bridged by a conducting section of the strand to close the circuit.

11. Apparatus for handling a continuous strand comprising means for supplying a strand, means for receiving the strand, means for continuously drawing the strand from the supply means to the receiving means, means for guiding the strand along a predetermined path from the supply means to the receiving means comprising a guide having closely-spaced juxtaposed thread-guiding sections of electrically conductive material spaced lengthwise of said path and a section of electrically non-conductive material for separating the conductive sections from each other, said conductive sections being positioned along said path to provide lateral support, and to be engaged by, the strand in passing along the path, and electrical means responsive to a current passed therethrough to stop the drawing means when the conductive sections are bridged by a conductive segment of the strand, said conductive sections being terminals of an electrical circuit for energizing said electrical stopping means.

12. Apparatus as defined in claim 11 wherein the conductive sections of the guide are coaxial eyelets.

References Cited in the file of this patent

UNITED STATES PATENTS

| Number | Name | Date |
|---|---|---|
| 1,782,397 | Adams | Nov. 25, 1930 |
| 1,782,402 | Bouvier et al. | Nov. 25, 1930 |
| 2,177,457 | Martindell | Oct. 24, 1939 |
| 2,400,837 | Nesterowicz | May 21, 1946 |
| 2,412,324 | Crum | Dec. 10, 1946 |
| 2,509,017 | Sear | May 23, 1950 |

FOREIGN PATENTS

| Number | Country | Date |
|---|---|---|
| 655,017 | Germany | Feb. 21, 1936 |
| 688,050 | France | May 6, 1930 |